(12) United States Patent
Saliger

(10) Patent No.: US 11,021,040 B2
(45) Date of Patent: Jun. 1, 2021

(54) FRONT-WINDSCREEN AIR DEFLECTOR BAR

(71) Applicant: FORD GLOBAL TECHNOLOGIES, LLC, Dearborn, MI (US)

(72) Inventor: Michael Saliger, Bedburg (DE)

(73) Assignee: Ford Global Technologies, LLC, Dearborn, MI (US)

(*) Notice: Subject to any disclaimer, the term of this patent is extended or adjusted under 35 U.S.C. 154(b) by 196 days.

(21) Appl. No.: 16/219,134

(22) Filed: Dec. 13, 2018

(65) Prior Publication Data
US 2019/0202260 A1     Jul. 4, 2019

(30) Foreign Application Priority Data

Jan. 3, 2018 (DE) .................. 102018200044.1

(51) Int. Cl.
| | | |
|---|---|---|
| B60H 1/24 | (2006.01) | |
| B60H 1/00 | (2006.01) | |
| B60S 1/54 | (2006.01) | |
| B60H 1/34 | (2006.01) | |
| B60S 1/02 | (2006.01) | |
| B60H 1/22 | (2006.01) | |

(52) U.S. Cl.
CPC ..... *B60H 1/00592* (2013.01); *B60H 1/00271* (2013.01); *B60H 1/00871* (2013.01); *B60H 1/242* (2013.01); *B60H 1/3421* (2013.01); *B60S 1/54* (2013.01); *B60H 2001/2293* (2013.01); *B60S 1/023* (2013.01)

(58) Field of Classification Search
CPC ........ B60S 1/54; B60S 1/023; B60H 1/00592; B60H 1/00871; B60H 1/242

USPC ......................................... 454/127
See application file for complete search history.

(56) References Cited

U.S. PATENT DOCUMENTS 2,096,901 A * 10/1937 Knecht ............... B60S 1/54
454/127
2,301,512 A * 11/1942 Breese ............... B60H 1/245
454/149

(Continued)

FOREIGN PATENT DOCUMENTS

| DE | 102011119550 A1 | 5/2012 |
|---|---|---|
| DE | 102011052680 A1 | 2/2013 |

OTHER PUBLICATIONS

English Machine Translation of DE102011052680A1 dated Feb. 14, 2013.

(Continued)

*Primary Examiner* — Vivek K Shirsat
*Assistant Examiner* — Ko-Wei Lin
(74) *Attorney, Agent, or Firm* — David Coppiellie; King & Schickli, PLLC

(57) ABSTRACT

An air deflector bar extends parallel to an upper edge of a front windscreen of a motor vehicle. The air deflector bar includes an air deflection channel that extends along its length. The air deflection channel is concavely delimited in cross section by means of a first side that butts against the front windscreen and a second side that is connected to the first side and is at a distance from the first side. The inner surface of the second side of the air deflector bar is oriented toward an edge of a dashboard of the motor vehicle, which edge delimits the dashboard toward a passenger interior.

4 Claims, 1 Drawing Sheet

(56) References Cited

U.S. PATENT DOCUMENTS

| | | | | |
|---|---|---|---|---|
| 2,747,495 | A * | 5/1956 | Muller | B60H 1/3442 |
| | | | | 454/154 |
| 3,118,362 | A * | 1/1964 | Suisse | B60H 1/28 |
| | | | | 454/147 |
| 4,109,562 | A * | 8/1978 | MacDonald | B60H 1/247 |
| | | | | 454/124 |
| 6,089,971 | A * | 7/2000 | Jokela | B60S 1/54 |
| | | | | 454/127 |
| 6,394,890 | B1 * | 5/2002 | Merkel | B60H 1/242 |
| | | | | 454/121 |
| 8,550,147 | B2 | 10/2013 | Lansinger | |
| 2009/0298411 | A1 * | 12/2009 | Stefani | B60H 1/247 |
| | | | | 454/152 |
| 2012/0276831 | A1 * | 11/2012 | Wang | B60H 1/00742 |
| | | | | 454/75 |
| 2014/0370797 | A1 * | 12/2014 | Beau | B60R 13/0256 |
| | | | | 454/152 |

OTHER PUBLICATIONS

English Machine Translation of DE102011119550A1 dated May 16, 2012.
"Kia Forte: Windshield defrosting and defogging—Features of your vehicle—Kia Forte TD 2014-2016 Owners Manual"; Kia; http://www.kifomanual.com/windshield_defrosting_and_defogging-86.html; Copyright 2014-2016; pp. 1-6.

\* cited by examiner

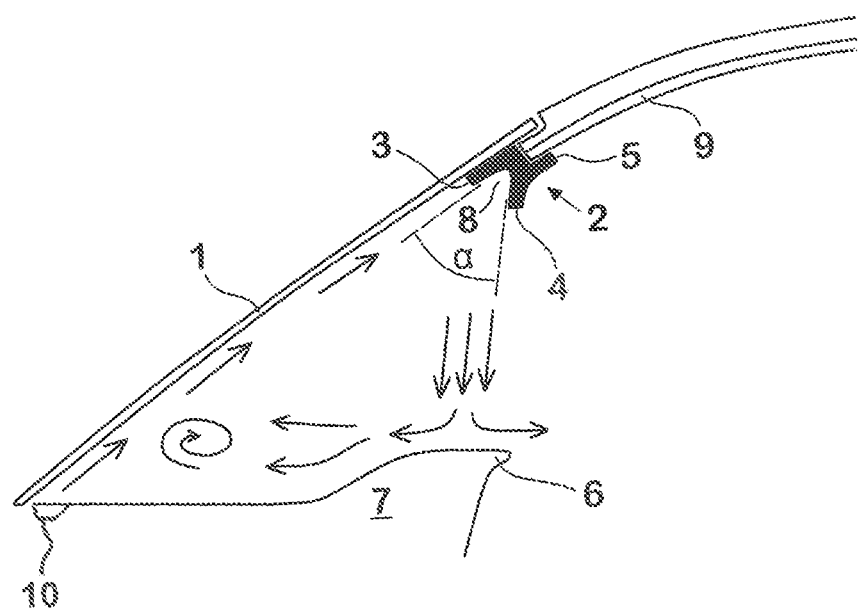

FRONT-WINDSCREEN AIR DEFLECTOR BAR

TECHNICAL FIELD

The document relates to an apparatus in the form of an air deflector bar, which extends parallel to an upper edge of a front windscreen of a motor vehicle and which incorporates an air deflection channel which runs along its length. The air deflection channel is concavely delimited in cross section by means of a first side of the bar which butts against the front windscreen and by means of a second side of the bar which is connected to the first side and is at a distance from the first side. This document also relates to a motor vehicle incorporating such an air deflector bar.

BACKGROUND

An air deflector bar is known from U.S. Pat. No. 6,394,890 B1 if concavity is understood in the mathematical sense, as well as in this case, that is to say inclusive of possible straight sections. The air deflection channel of this air deflector bar has a U-shaped cross section, wherein the two sides are parallel to each other. Warm air which flows upward from the windscreen-heater air outlets on the dashboard via the inner surface of the front windscreen is deflected by the air deflector bar by 180° and flows back exactly opposite to the upward flowing air. This is to help the front windscreen to be demisted or de-iced more quickly, and is also to keep the warm air in the region of the dashboard and to prevent it impinging upon the head and eyes of occupants of the vehicle.

U.S. Pat. No. 2,096,901 discloses a similar air deflector bar, of which the side which does not butt against the front windscreen, curves towards the passenger interior so that it does not concavely delimit the air deflection channel in cross section. A specifically directed air flow can therefore not be created. This air deflector bar is also designed so that it directs the air issuing from a central nozzle behind the front windscreen from the middle to the sides of the windscreen.

SUMMARY

It is an objective of this document to provide an apparatus in the form of a front-windscreen air deflector bar, which in a particularly effective manner prevents misting of the front windscreen or removes existing mist, and a motor vehicle which is provided with such an air deflector bar.

This object is achieved by means of an air deflector bar and a motor vehicle having the features of the following claims.

The inner surface, i.e. the surface of the second side of the air deflector bar which delimits the air deflection channel, is oriented toward an edge of a dashboard of the motor vehicle, which edge delimits the dashboard toward a passenger interior.

In this way, the warm air flow, which has passed the front windscreen, is not deflected by the air deflector bar exactly in the opposite direction, as in the referenced U.S. Pat. No. 6,394,890 B1, but at an oblique angle to the front windscreen in the direction of the delimiting edge of the dashboard.

Where it impinges upon the dashboard, the warm air flow splits up into two partial flows, of which one returns to the air outlets of the windscreen heater and combines with the air which flows therefrom. As a result, an air circulation is created around the entire space between front windscreen and dashboard, which air circulation intensifies the warm air flow on the front windscreen instead of rather hindering it as readily occurs in the case of an exactly opposite backflow as in the referenced U.S. Pat. No. 6,394,890 B1.

The inner surface of the second side of the air deflector bar is especially oriented toward the edge of the dashboard in such a way that an air flow, which flows upward along the front windscreen, impinges upon the air deflector bar and is deflected thereby, is split up by the dashboard and its edge into two partial flows which are preferably approximately of the same size and of which one is directed to air outlets of a windscreen heater in the dashboard and the other is directed into the passenger interior, preferably in the direction of hands, but not faces of occupants of the vehicle.

In a preferred embodiment, the inner surfaces of the two sides of the air deflector bar are approximately straight in cross section in each case and are interconnected via a rounded surface of the air deflector bar so that the air deflection channel is delimited in cross section by a V-shape with rounded bottom. In the V-shape, the two sides of the air deflector bar preferably form an angle of between 30° and 60°.

In preferred embodiments, the air deflector bar is arranged and designed so that it overlaps a boundary between the front windscreen and a roof lining of the vehicle, preferably by means of a third side which extends over this boundary.

In accordance with an additional aspect, a motor vehicle is provided having such an air deflector bar. The air deflector bar, the front windscreen, the dashboard and windscreen-heater air outlets are arranged on the dashboard so that air from the air outlets which flows upward along the front windscreen is deflected by the air deflector bar into a type of closed air curtain which is formed between the air deflector bar and the edge of the dashboard.

BRIEF DESCRIPTION OF THE DRAWING FIGURES

Following is a description of exemplary embodiments with reference to the drawings. The single FIGURE of the drawings (FIG. 1) is a cross-sectional view through an automobile in the region of the windshield.

DETAILED DESCRIPTION

An apparatus in the form of an air deflector bar 2 extends along the entire width of the upper edge or roof edge of a front windscreen 1 of the motor vehicle. The air deflector bar 2 is a profiled element which in cross section incorporates three approximately straight sides 3, 4 and 5 which extend from a central connecting region of the air deflector bar 2 in three different directions and then end free.

A first side 3 butts against the front windscreen 1. A second side 4 is connected via a rounding to the first side 3 and extends in the direction toward an edge 6 on the dashboard 7, which edge delimits the dashboard 7 in relation to a passenger interior and in this example also toward the top.

The two sides 3 and 4 are arranged at an angle α to each other, in a V-shape with rounded bottom, and between them delimit an air deflection channel 8 which is therefore concavely delimited in cross section. That is to say, the cross-sectional limits of the air deflection channel 8 which are formed by the air deflector bar 2 are all either inwardly curved or straight in pieces. Between the free ends of the two sides 3 and 4 the air deflection channel 8 is open toward the dashboard 7.

A third side 5 of the air deflector bar 2 overlaps the forward edge of a roof lining 9, being the trim of the vehicle's roof.

Close to the front windscreen 1, located in the dashboard 7, is at least one windscreen-heater air outlet 10 from which in a so-called defrosting operation warm air reaches upward along the front windscreen 1, as indicated in the FIGURE by arrows on the front windscreen 1. The warm air then impinges upon the air deflector bar 2 and by its air deflection channel 8 is to a greater or lesser extent directed vertically downward, wherein it forms a basically closed air curtain over the entire width of the vehicle between the air deflector bar 2 and the edge 6 of the dashboard 7, as indicated in the FIGURE by three parallel arrows.

The air flow coming from the air deflector bar 2 splits up into two partial flows on the edge 6 of the dashboard 7, as indicated in the FIGURE by oppositely directed arrows, wherein the partial flows can be approximately of equal size, which can be adjusted by suitable selection of the angle $\alpha$, in fact even if the dashboard 7 is to a greater or lesser extent not rounded and the edge 7 is not very pronounced. Such a typical angle $\alpha$ is for example approximately 45° or lies between 30° and 60°.

One of the two partial flows flows back in the direction toward the windscreen-heater air outlets 10, combines there with the newly inflowing warm air and begins the cycle anew, and the other partial flow flows in a slightly diffused or fan-like manner into the passenger interior, in fact tending in the direction of the hands of occupants of the vehicle, in order to warm these, but not in the direction of their faces.

The front windscreen 1 and the dashboard 7 usually converge at an acute angle in motor vehicles. Therefore, in the corner where the windscreen-heater air outlets 10 are located smaller vortices tend to form, as indicated in the FIGURE by a spiral arrow. These vortices do not hinder the air flow from the windscreen-heater air outlets 10 but rather assist it and act in a supporting manner with regard to the prevention of misting of the front windscreen or to the removal of existing mist.

What is claimed:

1. An apparatus, comprising an air deflector bar that extends parallel to an upper edge of a front windscreen of a motor vehicle and incorporates an air deflection channel that is defined by a first side that butts against the front windscreen and a second side that is connected to the first side, wherein (a) an inner surface of the second side of the air deflector bar is oriented toward an edge of a dashboard of the motor vehicle, (b) said edge delimits the dashboard toward a passenger interior and said second side directs air toward said edge of said dashboard, (c) the inner surface of the second side of the air deflector bar is oriented toward the edge of the dashboard so that an air flow which flows upward along the front windscreen, impinges upon the air deflector bar and is deflected thereby toward the dashboard where said air flow is split up by the dashboard into two partial flows of approximately equal size, of which a first partial air flow is directed to air outlets of a windscreen heater in the dashboard and a second partial air flow is directed into the passenger interior, (d) an inner surface of the first side and the inner surface of the second side of the air deflector bar are approximately straight in cross section and are interconnected via a rounded surface of the air deflector bar so that the air deflection channel is a V-shape with a rounded bottom, (e) the first side and the second side of the air deflector bar are arranged at an angle $\alpha$ with a value of between 30° and 60° to each other, and (f) the air deflector bar is arranged to overlap a boundary between the front windscreen and a roof lining of the motor vehicle.

2. The apparatus as set forth in claim 1, wherein the air deflector bar has a third side that overlaps the boundary between the front windscreen and the roof lining of the motor vehicle.

3. The motor vehicle incorporating the apparatus of claim 1.

4. The motor vehicle incorporating the apparatus of claim 2.

\* \* \* \* \*